United States Patent
Ogawa

(10) Patent No.: US 8,243,337 B2
(45) Date of Patent: Aug. 14, 2012

(54) IMAGE PROCESSOR, IMAGE PROCESSING METHOD, AND COMPUTER PROGRAM PRODUCT

(75) Inventor: Takeshi Ogawa, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1164 days.

(21) Appl. No.: 12/041,882

(22) Filed: Mar. 4, 2008

(65) Prior Publication Data

US 2008/0225312 A1 Sep. 18, 2008

(30) Foreign Application Priority Data

Mar. 12, 2007 (JP) ................................. 2007-062525

(51) Int. Cl.
*G06T 5/00* (2006.01)
(52) U.S. Cl. ........ 358/3.27; 358/3.12; 358/2.1; 395/139
(58) Field of Classification Search .............. 358/3.27, 358/3.12, 2.1; 395/139
See application file for complete search history.

(56) References Cited

U.S. PATENT DOCUMENTS

| | | | | |
|---|---|---|---|---|
| 5,329,614 A | * | 7/1994 | Kidd et al. | 345/671 |
| 6,782,142 B2 | * | 8/2004 | Loce et al. | 382/296 |
| 7,085,003 B1 | * | 8/2006 | Belkhir | 358/1.9 |
| 2006/0098045 A1 | * | 5/2006 | Mizutani et al. | 347/43 |
| 2007/0115506 A1 | * | 5/2007 | Yada | 358/3.06 |
| 2007/0153303 A1 | * | 7/2007 | Abe et al. | 358/1.8 |

FOREIGN PATENT DOCUMENTS

| | | |
|---|---|---|
| JP | 6-175461 | 6/1994 |
| JP | 7-5738 | 1/1995 |
| JP | 2001-83760 | 3/2001 |
| JP | 2001-341352 | 12/2001 |
| JP | 3908699 | 1/2007 |

OTHER PUBLICATIONS

Dec. 20, 2011 Japanese official action in connection with a counterpart Japanese patent application.

* cited by examiner

*Primary Examiner* — Twyler Haskins
*Assistant Examiner* — Michael Burleson
(74) *Attorney, Agent, or Firm* — Cooper & Dunham LLP

(57) ABSTRACT

For (CMYK) (x,y) data, a target-pixel checking unit calculates a target-pixel integrated value a(x,y) from CMYK binary data of a target pixel and a surrounding-pixel checking unit calculates a maximum surrounding pixel integrated value n(x,y) from respective CMYK binary data of surrounding pixels that are adjacent to the target pixel. Based on the target-pixel integrated value and the maximum surrounding pixel integrated value, a comparison determining unit estimates a higher toner pile height. The comparison determining unit adds transparent image data W(x,y) to the input data CMYK(x,y) and outputs output image data CMYKW(x,y) such that the toner pile heights become even.

20 Claims, 4 Drawing Sheets

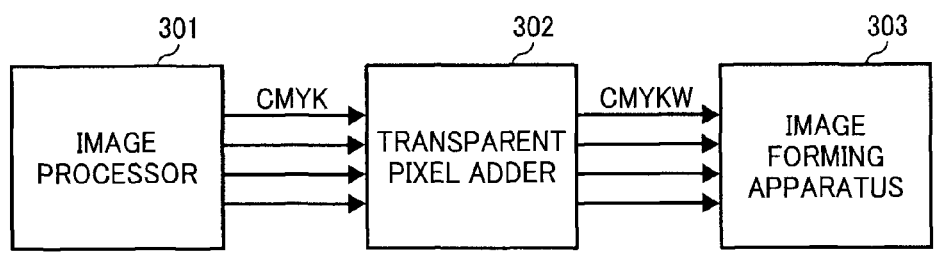
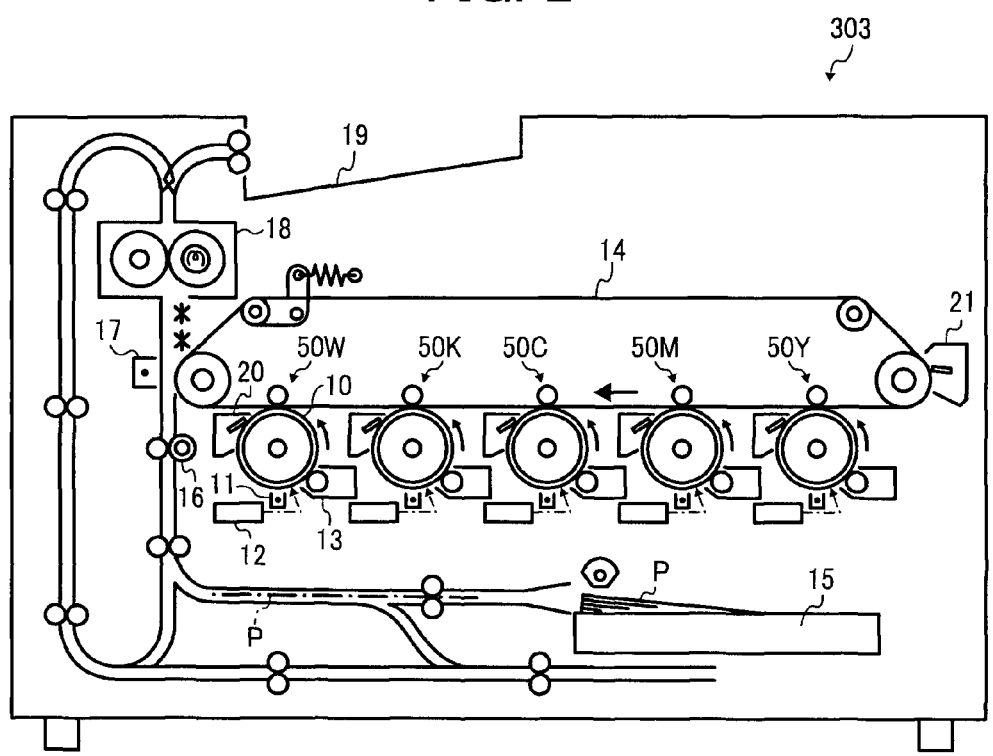

MAIN SCANNING DIRECTION

MAIN SCANNING DIRECTION

IMAGE PROCESSOR, IMAGE PROCESSING METHOD, AND COMPUTER PROGRAM PRODUCT

CROSS-REFERENCE TO RELATED APPLICATIONS

The present application claims priority to and incorporates by reference the entire contents of Japanese priority document 2007-062525 filed in Japan on Mar. 12, 2007.

BACKGROUND

1. Technical Field

This disclosure relates to an image processor that carries out image processing on image data that is output in an image forming apparatus.

2. Description of the Related Art

Recently, it is widely known that in an image forming apparatus such as a multi function peripheral (MFP) or a printer etc., a toner scatters during fixing due to asperities that occur in an image portion, or due to a level difference that occurs in a boundary of the image portion and a non-image portion. Due to this, image quality significantly deteriorates.

Further, to improve the image quality, some of the image forming apparatuses use a transparent toner or a white toner apart from normal color toners of cyan (C), magenta (M), yellow (Y), and black (K) colors.

In a method disclosed in Japanese Patent Application Laid-open No. H6-175461, four color developing units, which develop a corresponding image with a corresponding color toner, and one transparent developing unit, which develops a corresponding image with a transparent toner, are arranged in a transfer unit. Electrostatic latent images on photosensitive drums are developed with color toners, and a non-image portion on the photosensitive drums is developed with the transparent toner. This approach makes it possible to match the heights of the toner layer in the image area and the non-image area and to eliminate the asperities of the image surface. Further, Japanese Patent Application Laid-open No. 2005-37431 teaches to develop the non-image area with a transparent toner to equalize an abrasion rate of the photosensitive drums.

Japanese Patent Application Laid-open No. H7-5738 discloses to overlap a transparent toner on an asperity portion of a multicolor image and then fix the image to a transfer sheet. With this approach, it is possible to round off the asperities of the multicolor image arising due to overlapping of the color toners, as well as eliminate occurrence of an incompletely melted toner portion during fixing.

In a method disclosed in Japanese Patent Application Laid-open No. 2001-341352, a white toner is coated on shaggy jags that occur in a slanting edge portion, the resulting image is printed, edges of shaggy corners are eliminated, and shaggy portions are smoothened to get a smoothing effect, thus recreating a lustrous image.

However, in the methods disclosed in Japanese Patent Application Laid-open No. H6-175461 and Japanese Patent Application Laid-open No. 2005-37431, because the transparent toner is developed in the entire non-image portion, a consumption of the transparent toner increases, thus increasing a running cost.

Further, in the method disclosed in Japanese Patent Application Laid-open No. H7-5738, an asperity difference between a developing portion where the multicolor image and the transparent toner are developed and a non-developing portion increases. Due to this, the toner scatters during fixing in such a boundary portion and the image quality deteriorates. In an electrophotograph, a light amount and a pulse width of a laser are changed to carry out multiple grayscale control inside a single dot. Carrying out the multiple grayscale control inside the single dot, in other words, developing the image using a faint light exposure results in occurrence of dots in which the toner is not sufficiently accumulated. Thus, the asperities of the toner layers are not eliminated in the method that is disclosed earlier.

Further, in the method disclosed in Japanese Patent Application Laid-open No. 2001-341352, because the white toner is not coated adjacent to vertical lines and horizontal lines, if an image such as a table is output, the toner scatters during fixing and deterioration of the image quality cannot be curbed.

Combining and using the technologies that are disclosed in Japanese Patent Application Laid-open No. H7-5738 and Japanese Patent Application Laid-open No. 2001-341352 enables to curb scattering of the toner during fixing due to the asperities that occur in the image portion and due to the level difference that occurs in the boundary of the image portion and the non-image portion. However, because processes need to be carried out individually, efficiency is reduced.

BRIEF SUMMARY

According to an aspect of this disclosure, there is provided an image processor that executes a process to add a second image data to a first image data that includes a plurality of colors. The image processor includes a target-pixel checking unit that checks a target pixel; a surrounding-pixel checking unit that checks surrounding pixels that are pixels that surround the target pixel; and a generating unit that generates, based on a check result of the target-pixel checking unit and a check result of the surrounding-pixel checking unit, the second image data that is to be added to the first image data.

According to another aspect of this disclosure, there is provided an image processing method including adding a second image data to a first image data that includes a plurality of colors. The image processing method includes checking a target pixel and surrounding pixels that are pixels that surround the target pixel; and generating, based on a result obtained at the checking, the second image data that is to be added to the first image data.

According to another aspect of this disclosure, there is provided a computer program product comprising a computer usable medium having computer readable program codes embodied in the medium that, when executed, causes a computer to execute the aforementioned image processing method.

The aforementioned and other aspects, features, advantages and technical and industrial significance will be better understood by reading the following detailed description of presently preferred embodiments, when considered in connection with the accompanying drawings.

BRIEF DESCRIPTION OF THE DRAWINGS

FIG. 1 is a block diagram of an image processor according to a first embodiment of the present invention;

FIG. 2 is a schematic of a structure of an image forming apparatus according to the first embodiment;

DETAILED DESCRIPTION OF THE PREFERRED EMBODIMENTS

Figure 3:
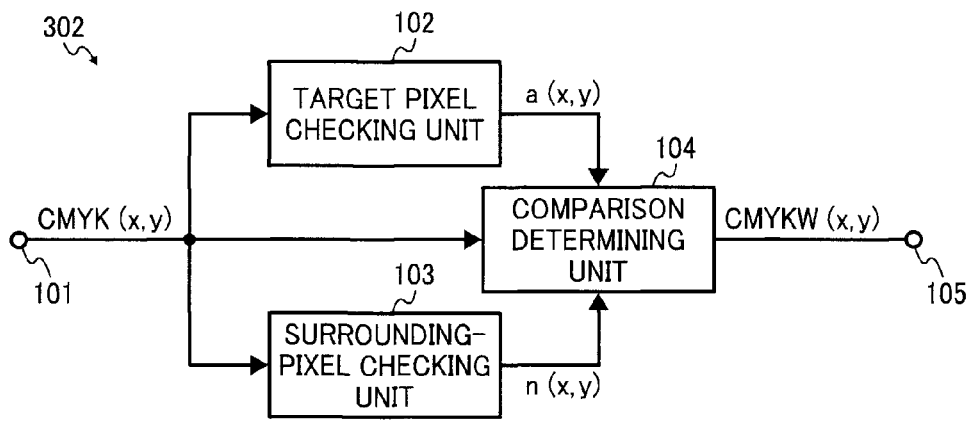
FIG. 3 is a block diagram of a transparent pixel adder shown in FIG. 1.

Exemplary embodiments of the present invention are explained below in detail with reference to the accompanying drawings.

FIG. 1 is a schematic of an image input-output system that uses an image processor according to a first embodiment of the present invention. In the image input-output system, an image processor 301 converts a multivalued red (R), green (G), blue (B) image, which is input from a scanner (not shown) or a digital camera (not shown) etc., into a cyan (C), magenta (M), yellow (Y), black (K) quantum image that can be output from an image forming apparatus 303.

The quantum image that is output from the image processor 301 is quantized to a number that can be divided by the image forming apparatus 303. If a binary output is enabled in the image forming apparatus 303, the image processor 301 binarizes and outputs CMYK quantized data to a transparent pixel adder 302. If a quaternary output is enabled in the image forming apparatus 303, the image processor 301 outputs quaternarized CMYK quantized data to the transparent pixel adder 302. In the first embodiment, the image forming apparatus 303 is explained by using an example of a recording device that can carry out a binary output.

The transparent pixel adder 302 adds transparent pixel image data to CMYK binary image data that is input from the image processor 301 and outputs a CMYKW binary image, of cyan (C), magenta (M), yellow (Y), black (K), and transparent (W) colors, to the image forming apparatus 303.

FIG. 2 depicts a structure of the image forming apparatus 303. In the image forming apparatus 303, which is a color a image forming apparatus, toner images of Y, M, C, K, and W (white or transparent) colors are formed on rotating surfaces of a plurality of image forming members. Next, the toner images are overlapped and transferred onto an intermediate transfer member (primary transfer), and the toner images are transferred again (secondary transfer) onto a transfer material.

Each of image forming units 50Y, 50M, 50C, 50K, and 50W, of Y, M, C, K, and W colors respectively, includes a photosensitive drum 10, a charger 11, an exposure optical system 12, a developing unit 13, and a cleaning device 20. Each image forming unit is arranged at an upstream side in a rotational direction of a transfer belt 14, which is the belt shaped intermediate transfer member, in a sequence of the image forming units 50Y, 50M, 50C, 50K, and 50W. Y, M, C, and K toner images, which are formed on the image forming units 50Y, 50M, 50C, and 50K respectively, are sequentially overlapped and transferred (primary transfer) onto the rotating surface of the transfer belt 14, thus forming a color toner image. A transparent toner image, which is formed on the image forming unit 50W, is further overlapped on the uppermost layer of the color toner image.

A sheet feeding cassette 15 feeds a recording sheet P via a timing roller 16. A transfer unit 17 carries out discharge of a reverse polarity with respect to the toner. Due to this, the transparent toner image of the uppermost layer and the color toner image of the lower layer are transferred (secondary transfer) together onto a surface of the recording sheet P. The transparent toner image is transferred as the lowermost layer onto the recording sheet P and the color toner image is transferred on the transparent toner image. A fixing device 18 fixes the toner image on the recording sheet P. Next, the recording sheet P is shifted in a horizontal direction and is ejected in a tray 19 on an upper portion of the image forming apparatus 303. After the transfer belt 14 has completed the transfer, a cleaning device 21 removes and cleans residual toner from the transfer belt 14.

In the image input-output system shown in FIG. 1, although respective devices are indicated as independent devices according to a process, the present invention is not to be thus limited, and a function of the transparent pixel adder 302 can also be included in the image processor 301 or in the image forming apparatus 303.

Figure 4:
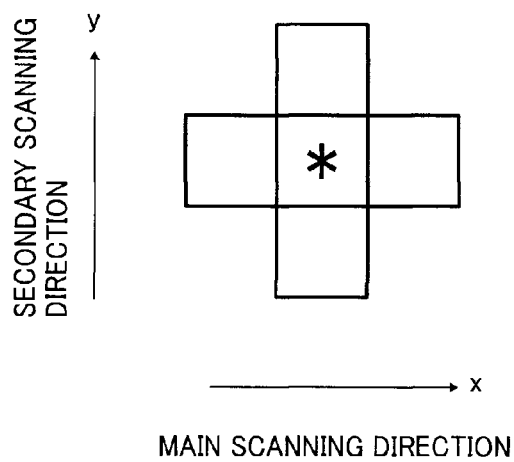
FIG. 4 is a schematic of pixels that are checked.

FIG. 3 is a block diagram of the transparent pixel adder 302. The image processor 301 inputs into an input terminal 101 of the transparent pixel adder 302 five pixels that are shown in FIG. 4. In other words, the image processor 301 inputs into the input terminal 101, data $CMYK(x,y)$ which includes respective CMYK binary data of a target pixel $(x,y)$ (the pixel indicated by an asterix symbol), and four pixels $(x-1,y)$, $(x+1,y)$, $(x,y-1)$, and $(x,y+1)$ that are adjacent to the target pixel. Thus, the data $CMYK(x,y)$ includes data of $C(x,y)$, $M(x,y)$, $Y(x,y)$, $K(x,y)$, $C(x+1,y)$, $M(x+1,y)$, $Y(x+1,y)$, $K(x+1,y)$, $C(x-1,y)$, $M(x-1,y)$, $Y(x-1,y)$, $K(x-1,y)$, $C(x,y+1)$, $M(x,y+1)$, $Y(x,y+1)$, $K(x,y+1)$, $C(x,y-1)$, $M(x,y-1)$, $Y(x,y-1)$, and $K(x,y-1)$.

Two-dimensional image data is represented as $CMYK(x,y)$ (x is an address in a main scanning direction of the image and y is an address in a secondary scanning direction). Further, 1 in binary data indicates a dot on and 0 in the binary data indicates a dot off.

Next, the input data $CMYK(x,y)$ is input into a target-pixel checking unit 102, a surrounding-pixel checking unit 103, and a comparison determining unit 104.

The target-pixel checking unit 102 uses the input data $CMYK(x,y)$ and Equation (1) to calculate a target-pixel integrated value $a(x,y)$, and outputs the calculated target-pixel integrated value $a(x,y)$ to the comparison determining unit 104.

If a total value of CMYK binary signals in a pixel position $(x,y)$ is treated as an integrated value, the integrated value is calculated from Equation (1):

$$a(x,y)=C(x,y)+M(x,y)+Y(x,y)+K(x,y) \quad (1)$$

The surrounding-pixel checking unit 103 uses the input data $CMYK(x,y)$ and Equation (2) to calculate a maximum surrounding pixel integrated value $n(x,y)$ and outputs the calculated maximum surrounding pixel integrated value $n(x,y)$ to the comparison determining unit 104.

As shown in FIG. 4, surrounding pixels means four pixels $(x-1,y)$, $(x+1,y)$, $(x,y-1)$, and $(x,y+1)$ that are adjacent to the target pixel. If the maximum value of the integrated values in the four surrounding pixels is treated as the maximum surrounding pixel integrated value $n(x,y)$, the maximum surrounding pixel integrated value $n(x,y)$ is calculated from Equation (2):

$$n(x,y)=\mathrm{Max}(C(x+1,y)+M(x+1,y)+Y(x+1,y)+K(x+1,y),$$
$$C(x-1,y)+M(x-1,y)+Y(x-1,y)+K(x-1,y),$$
$$C(x,y+1)+M(x,y+1)+Y(x,y+1)+K(x,y+1),$$
$$C(x,y-1)+M(x,y-1)+Y(x,y-1)+K(x,y-1)) \quad (2)$$

Using the target-pixel integrated value $a(x,y)$ received from the target-pixel checking unit 102 and the maximum surrounding pixel integrated value $n(x,y)$ that is received from the surrounding-pixel checking unit 103, the comparison determining unit 104 generates binary image data with respect to transparent pixels from Equation (3):

If $(a(x,y)<n(x,y))$, then $W(x,y)=1$, else then $W(x,y)=0$ \hfill (3)

The comparison determining unit 104 adds transparent image data W(x,y) to the input data CMYK(x,y) to generate output image data CMYKW(x,y) and outputs the generated output image data CMYKW(x,y) to an output terminal 105.

The output terminal 105 outputs the output image data CMYKW(x,y) to the image forming apparatus 303.

In this manner, the transparent pixel adder 302 adds transparent pixel image data to the CMYK binary image data.

A principle behind enhancement of image quality using the process mentioned earlier is explained next.

Because the input data CMYK(x,y) is binary data (1,0), as in Equation (1), the target-pixel integrated value a(x,y), which is the total value of the CMYK binary signals, counts a number of dots that are integrated in the target pixel. Similarly, as in Equation (2), the maximum surrounding pixel integrated value n(x,y) checks the maximum value of the number of dots that are integrated in the surrounding pixels. As shown in Equation (3), comparing the target-pixel integrated value a(x, y) and the maximum surrounding pixel integrated value n(x, y) enables to estimate whether the piled up toner is higher in adjacent pixel positions than in a target-pixel position, in other words, enables to estimate a higher toner pile height.

If the piled up toner is higher in the adjacent pixel positions compared to the target-pixel position, the transparent toner is piled up in the target-pixel position. If the piled up toner is equal in the target-pixel position and the adjacent pixel positions, or if the piled up toner in the adjacent pixel positions is lower compared to the target-pixel position, piling up of the transparent toner is not necessary.

Based on a determination using Equation (3), the transparent toner is piled up in the asperities that occur in the imaging portion. As a result, the toner pile height becomes even. Further, because the transparent toner is output in a boundary portion of the image portion and the non-image portion, a level difference that occurs in the boundary of the image portion and the non-image portion is reduced. Thus, scattering of the color toner during fixing can be curbed.

Although scattering of the toner during fixing cannot be completely curbed even with the method explained in the first embodiment, because the transparent toner, which is output in the boundary portion of the image portion and the non-image portion, is scattered during fixing, the scattered transparent toner is not visible. Further, although the first embodiment is explained using a transparent toner, a white toner can also be similarly used with the result that the scattered white toner is not visible. Thus, carrying out the process mentioned earlier enhances image quality.

In the first embodiment, the image forming apparatus 303 is explained as the recording device that can carry out the binary output. However, the present invention can be similarly applied to a recording device that can divide multiple values such as trinary values or quaternary values. In a second embodiment of the present invention explained below, an image forming apparatus is a recording device that can carry out trinary output (2, 1, and 0 that indicate a large dot, a small dot, and a dot off respectively).

Figure 5:
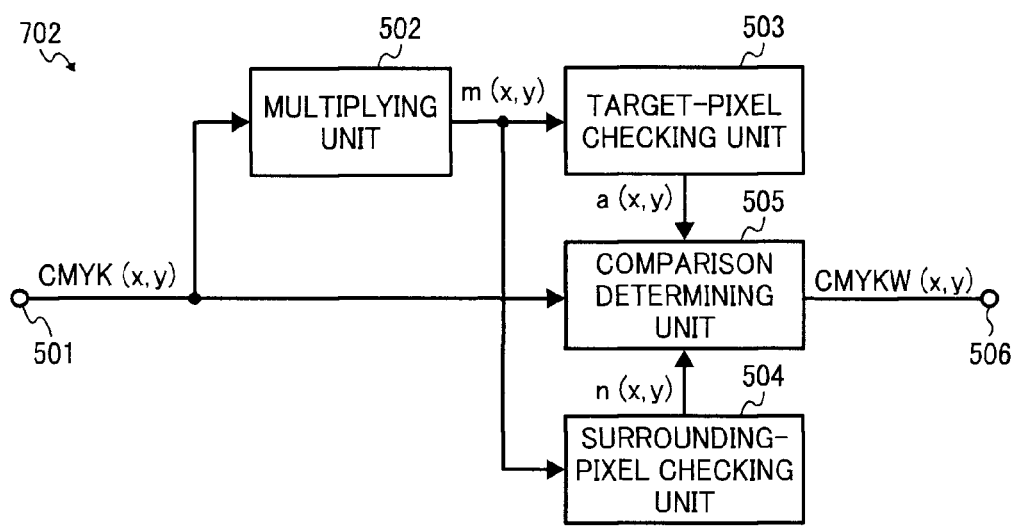
FIG. 5 is a block diagram of a transparent pixel adder according to a second embodiment of the present invention.

FIG. 5 is a block diagram of a transparent pixel adder 702 according to the second embodiment. This transparent pixel adder 702 can be used in the image input-output system shown in FIG. 1 instead of the transparent pixel adder 302.

The image processor 301 inputs into an input terminal 501 of the transparent pixel adder 702 five pixels that are shown in FIG. 4. In other words, the image processor 301 inputs into the input terminal 501, the data CMYK(x,y) that includes respective CMYK trinary data of the target pixel (x,y) and the four pixels (x−1,y), (x+1,y), (x,y−1), and (x,y+1) that are adjacent to the target pixel.

Two-dimensional image data is represented as CMYK(x,y) (x is the address in the main scanning direction of the image and y is the address in the secondary scanning direction of the image).

The input data CMYK(x,y) is input into a multiplying unit 502 and a comparison determining unit 505.

As shown in Equation (4), the multiplying unit 502 carries out multivaluing of the respective CMYK trinary data CMYK (x,y) of the five pixels that are shown in FIG. 4. Next, the multiplying unit 502 outputs to a target-pixel checking unit 503 and a surrounding-pixel checking unit 504, multivalued data m(x,y) that includes Cm(x,y), Mm(x,y), Ym(x,y), Km(x, y), Cm(x+1,y), Mm(x+1,y), Ym(x+1,y), Km(x+1,y), Cm(x−1,y), Mm(x−1,y), Ym(x−1,y), Km(x−1,y), Cm(x,y+1), Mm(x,y+1), Ym(x,y+1), Km(x,y+1), Cm(x,y−1), Mm(x,y−1), Ym(x,y−1), Km(x,y−1). Cm(x,y) is multivalued data that is obtained by multivaluing C(x,y). Multivalued data for MYKW are similarly obtained.

Equation (4) indicates an example of a calculation on C(x, y) among the CMYK trinary data CMYK(x,y) of the five pixels that are shown in FIG. 4. Small and large indicated in Equation (4) are adjustable values. For example, small is set to 192 and large is set to 255.

If $(C(x,y)=0)$ then $Cm(x,y)=0$ else if $(C(x,y)=1)$ then $Cm(x,y)=$small else then $Cm(x,y)=$large \hfill (4)

Using the multivalued data m(x,y) and Equation (1)', the target-pixel checking unit 503 calculates a target-pixel integrated value a(x,y) and outputs the calculated target-pixel integrated value a(x,y) to the comparison determining unit 505:

$a(x,y)=Cm(x,y)+Mm(x,y)+Ym(x,y)+Km(x,y)$ \hfill (1)'

Using the multivalued data m(x,y) and Equation (2)', the surrounding-pixel checking unit 504 calculates a maximum surrounding pixel integrated value n(x,y) and outputs the calculated maximum surrounding pixel integrated value n(x, y) to the comparison determining unit 505:

$n(x,y)=\mathrm{Max}(Cm(x+1,y)+Mm(x+1,y)+Ym(x+1,y)+Km(x+1,y),$ $Cm(x-1,y)+Mm(x-1,y)+Ym(x-1,y)+Km(x-1,y),$ $Cm(x,y+1)+Mm(x,y+1)+Ym(x,y+1)+Km(x,y+1),$ $Cm(x,y-1)+Mm(x,y-1)+Ym(x,y-1)+Km(x,y-1))$ \hfill (2)'

Using the target-pixel integrated value a(x,y) received from the target-pixel checking unit 503 and the maximum surrounding pixel integrated value n(x,y) received from the surrounding-pixel checking unit 504, the comparison determining unit 505 generates trinary image data with respect to the transparent pixels from Equation (5):

If $(n(x,y)-a(x,y)>$large$)$ then $W(x,y)=2$ else if $(n(x,y)-a(x,y)>$small$)$ then $W(x,y)=1$ else then $W(x,y)=0$ \hfill (5)

The comparison determining unit 505 adds transparent image data W(x,y) to the input data CMYK(x,y) that is input by the input terminal 501 to generate output image data CMYKW(x,y) and outputs the output image data CMYKW (x,y) to an output terminal 506. The output terminal 506 outputs the output image data CMYKW(x,y) to the image forming apparatus 303.

A principle behind enhancement of image quality using the process mentioned earlier is explained next.

Upon carrying out trinary developing in an electrophotograph, which exercises multiple grayscale control inside a single dot by changing a light amount and a pulse width of a laser, a pixel that becomes a small dot is developed by a faint light exposure and a pixel that becomes a large dot is developed by a strong light exposure. A condensed toner amount of the developed small dot is likely to be less than half of the condensed toner amount of the developed large dot. Due to this, a height of the piled up toner at a pixel position where two small dots have overlapped is not the same as a height of the piled up toner at a pixel position that includes a single large dot. Generally, the toner amount of the small dot is between one third to two third of the toner amount of the large dot. Values of small and large, which are used in Equations (4) and (5), can be set according to characteristics of an output device.

Based on a determination using Equations (4) and (5), the transparent toner is piled up in the asperities that occur in the imaging portion. As a result, the toner pile height becomes even and scattering of the color toner during fixing can be curbed.

In the first and the second embodiments mentioned earlier, the pixels, which are checked by the surrounding-pixel checking units 103 and 504, are explained as the four pixels that are shown in FIG. 4. However, as shown in FIGS. 6 and 7, more than four pixels can be checked.

Figure 6:
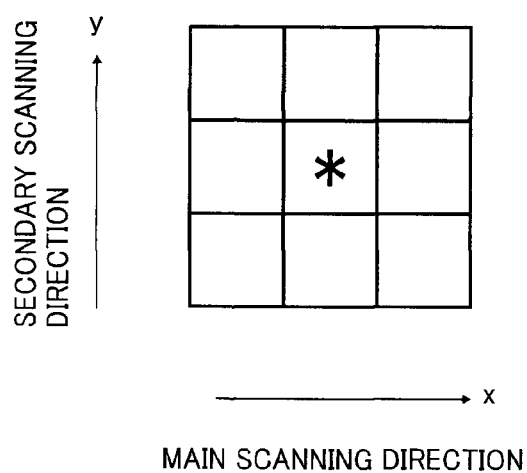
FIG. 6 is a schematic of the pixels that are checked.
Figure 7:
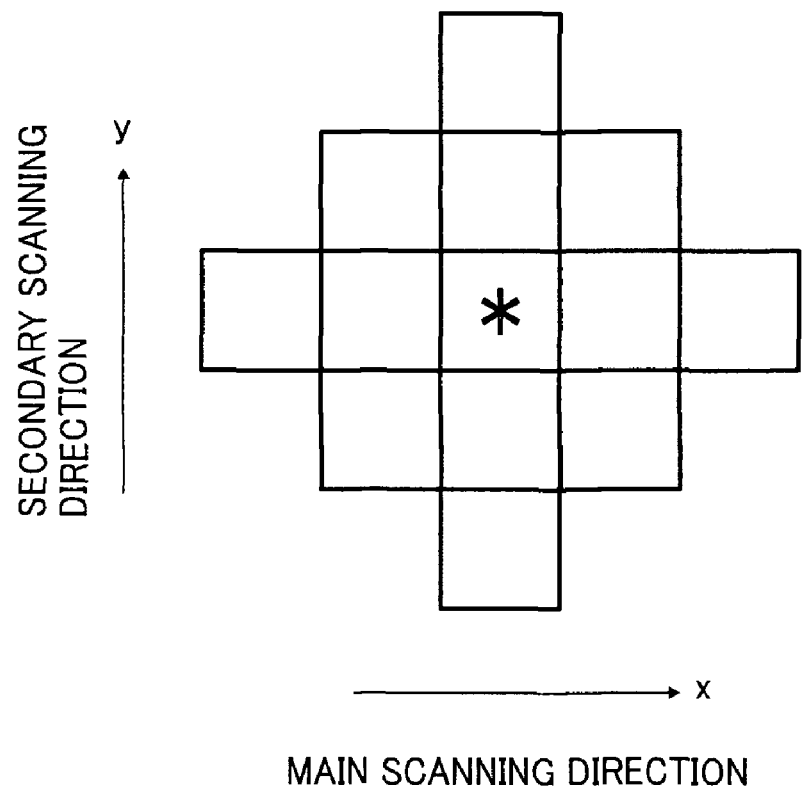
FIG. 7 is another schematic of the pixels that are checked.

As shown in FIG. 6, pixels in a diagonal direction of the target pixel are also checked. Thus, outputting the transparent toner in the boundary portion in the diagonal direction of the image portion and the non-image portion enables to further curb scattering of the color toner during fixing.

During checking of the pixels that are shown in FIG. 4, the transparent toner is output in one line in the boundary portion of the image portion and the non-image portion. However, if the pixels shown in FIG. 7 are checked, the transparent toner is output in two lines in the boundary portion of the image portion and the non-image portion. Thus, scattering of the color toner during fixing can be further curbed.

If the determination using Equation (3) is changed to a determination using Equation (6), the transparent toner can be always superimposed in the pixels from which the color toner is output. In Equation (3), the pixel from which the color toner is output is compared to the adjacent pixels and the transparent toner is output only upon determining that the piled up toner is higher in the adjacent pixels. However, if Equation (6) is used, the transparent toner is output upon determining that the piled up toner is higher in the adjacent pixels or the transparent toner is output when the color toner is output from even one pixel in the target-pixel position. Due to this, the transparent toner is continuously output in the boundary portion of the image portion and the non-image portion. If a plate gap of approximately one pixel is introduced between a plate of the transparent toner and a plate of the color toner, scattering of the color toner during fixing can be curbed without occurrence of any drawback.

If $(a(x,y)<n(x,y))$ then $W(x,y)=1$ else if $(a(x,y)>0)$ then $W(x,y)=1$ else then $W(x,y)=0$ (6)

If the determination using Equation (3) is changed to a determination using Equation (7), the transparent toner is not superimposed unless heights of the toners in the target-pixel position and the adjacent pixel positions differ by two levels or more. Thus, in Equation (3), the transparent toner is always output if the image portion includes asperities. However, in Equation (7), the transparent toner is superimposed according to the height of the toner. Scattering of the color toner in the image portion during fixing is likely to occur in portions that include a significant level difference, in other words, in portions where the level difference between toner layers is of two levels.

Thus, by limiting output positions of the transparent toner to the portions mentioned earlier, scattering of the color toner during fixing can be curbed while curbing a running cost.

If $(n(x,y)-a(x,y)>1)$ then $W(x,y)=1$ else then $W(x,y)=0$ (7)

The first embodiment and the second embodiment can be applied to a system that includes a plurality of devices (for example, a host computer, an interface device, a reader, a printer etc.). Similarly, the first embodiment and the second embodiment can be applied to a single device (for example, a copier, a facsimile etc.).

An object of the present invention can also be achieved by providing in a system or a device, a recording medium that includes a recorded program code of software that realizes functions explained in the embodiments that are mentioned earlier, and by causing a computer (a central processing unit (CPU) or a micro processing unit (MPU)) of the system or the device to read and execute the program code that is stored in the storage medium. The program code itself, which is read from the recording medium, realizes the functions explained in the embodiments that are mentioned earlier.

A flexible disk, a hard disk, an optical disk, a magneto optical (MO) disk, a magnetic tape, a nonvolatile memory card, a read only memory (ROM) etc. can be used as the recording medium for providing the program code.

By executing the program code that is read by the computer, apart from realizing the functions explained in the embodiments that are mentioned earlier, based on instructions of the program code, an operating system (OS) that is operating on the computer executes actual processes entirely or in part and the functions that are explained in the embodiments mentioned earlier are also realized by the processes.

Further, the program code, which is read from the recording medium, is written to a memory that is included in a function expansion port that is inserted into the computer or a memory that is included in a function expanding unit that is connected to the computer. Next, based on the instructions of the program code, The CPU, which is included in the function expansion port or the function expanding unit, executes the actual processes entirely or in part and the functions that are explained in the embodiments mentioned earlier are also realized by the processes.

The embodiments of the present invention are explained. However, the present invention in its broader aspects is not limited to the specific details and representative embodiments shown and described herein. Accordingly, various modifications may be made without departing from the spirit or scope of the general inventive concept as defined by the appended claims and their equivalents.

According to an embodiment of the present invention, portions where image quality deteriorates are estimated and those portions are covered using a white toner or a transparent toner. As a result, scattering of toner during fixing can be curbed and an image of enhanced image quality can be output.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processor capable of executing a process to add a second image data to a first image data that includes a plurality of colors, the image processor comprising:
   a target-pixel checking unit that checks a target pixel of the first image data;
   a surrounding-pixel checking unit that checks surrounding pixels that are pixels that surround the target pixel;
   a comparison determining unit that compares a check result of the target-pixel checking unit and a check result of the surrounding-pixel checking unit and determines based on the comparison result whether the second image data is to be added to the first image data; and
   a generating unit that generates the second image data to be added to the first image data based on the determination result of the comparison determining unit,
   wherein the second image data is image data of any one of a transparent toner and a white toner.

2. The image processor according to claim 1, wherein
   the first image data is quantized n-value data (n being a natural number greater than or equal to 2),
   the target-pixel checking unit calculates, as an integrated value of the target pixel, a total value of respective pieces of n-value data of the plurality of colors in the target pixel,
   the surrounding-pixel checking unit calculates, as an integrated value of each of the surrounding pixels, a total value of respective pieces of n-value data of the plurality of colors in each of the surrounding pixels, and
   the comparison determining unit compares the integrated value of the target pixel and a maximum value among the integrated values of the surrounding pixels.

3. The image processor according to claim 2, wherein upon the integrated value of the target pixel being less than the maximum value of the integrated values of the surrounding pixels, the comparison determining unit determines that the second image data is to be added to a target-pixel position.

4. The image processor according to claim 2, wherein upon the integrated value of the target pixel not being zero, the comparison determining unit determines that the second image data is to be added to a target-pixel position.

5. The image processor according to claim 1, wherein
   the first image data is quantized n-value data (n is a natural number greater than or equal to 2),
   the target-pixel checking unit calculates, as an integrated value of the target pixel, a total value of respective pieces of multivalued data of the plurality of colors in the target pixel, the multivalued data being created from n-value data of corresponding color in the target pixel,
   the surrounding-pixel checking unit calculates, as an integrated value of each of the surrounding pixels, a total value of respective pieces of multivalued data of the plurality of colors in each of the surrounding pixels, the multivalued data being created from n-value data of corresponding color in each of the surrounding pixels, and
   the comparison determining unit compares the integrated value of the target pixel and a maximum value among the integrated values of the surrounding pixels and generates the second image data based on the comparison result.

6. The image processor according to claim 5, wherein the comparison determining unit determines, upon the integrated value of the target pixel being less than the maximum value of the integrated values of the surrounding pixels, that the second image data is to be added to a target-pixel position.

7. The image processor according to claim 5, wherein the comparison determining unit determines, upon the integrated value of the target pixel not being zero, that the second image data is to be added to a target-pixel position.

8. The image processor according to claim 1, wherein the surrounding pixels are four pixels that are adjacent to the target pixel.

9. The image processor according to claim 1, wherein the surrounding pixels are pixels within two pixels from the target pixel.

10. The image processor according to claim 1, wherein the comparison determining unit determines, upon an integrated value of the target pixel being less than a maximum value of integrated values of the surrounding pixels, that the second image data is to be added to a target-pixel position, the integrated value of the target pixel being a total value of respective data of the plurality of colors in the target pixel, and each of the integrated values of the surrounding pixels being a total value of respective data of the plurality of colors in each of the surrounding pixels.

11. An image processing method including adding a second image data to a first image data that includes a plurality of colors, the image processing method comprising:
    checking a target pixel and checking surrounding pixels that are pixels that surround the target pixel;
    comparing a result of checking the target pixel and a result of checking the surrounding pixels, and determining based on the comparison result whether the second image data is to be added to the first image data; and
    generating the second image data to be added to the first image data based on the determination result,
    wherein the second image data is image data of any one of a transparent toner and a white toner.

12. The image processing method according to claim 11, wherein
    the first image data is quantized n-value data (n is a natural number greater than or equal to 2),
    the checking includes (i) calculating, as an integrated value of the target pixel, a total value of respective pieces of n-value data of the plurality of colors in the target pixel and (ii) calculating, as an integrated value of each of the surrounding pixels, a total value of respective pieces of n-value data of the plurality of colors in each of the surrounding pixels, and
    the comparing includes comparing the integrated value of the target pixel and a maximum value among the integrated values of the surrounding pixels.

13. The image processing method according to claim 12, wherein the determining includes determining, upon the integrated value of the target pixel being less than the maximum value of the integrated values of the surrounding pixels, that the second image data is to be added to a target-pixel position.

14. The image processing method according to claim 12, wherein the determining includes determining, upon the integrated value of the target pixel not being zero, that the second image data is to be added to a target-pixel position.

15. The image processing method according to claim 11, wherein
    the first image data is quantized n-value data (n is a natural number greater than or equal to 2),
    the checking includes (i) calculating, as an integrated value of the target pixel, a total value of respective pieces of multivalued data of the plurality of colors in the target pixel, the multivalued data being created from n-value data of corresponding color in the target pixel and (ii) calculating, as an integrated value of each of the surrounding pixels, a total value of respective pieces of multivalued data of the plurality of colors in each of the surrounding pixels, the multivalued data being created from n-value data of corresponding color in each of the surrounding pixels, and the comparing includes comparing the integrated value of the target pixel and a maximum value among the integrated values of the surrounding pixels and generating the second image data based on the comparison result.

16. The image processing method according to claim 15, further comprising determining, upon the integrated value of the target pixel being less than the maximum value of the integrated values of the surrounding pixels, that the second image data is to be added to a target-pixel position.

17. The image processing method according to claim 15, further comprising determining, upon the integrated value of the target pixel not being zero, that the second image data is to be added to a target-pixel position.

18. The image processing method according to claim 11, wherein the surrounding pixels are four pixels that are adjacent to the target pixel.

19. The image processing method according to claim 11, wherein the surrounding pixels are pixels within two pixels from the target pixel.

20. A computer program product comprising a non-transitory computer useable medium having computer readable program codes embodied in that medium that, when executed, causes a computer to execute an image processing method including adding a second image data to a first image data that includes a plurality of colors, the computer readable program codes causing the computer to execute:

checking a target pixel and checking surrounding pixels that are pixels that surround the target pixel;

comparing a result of checking the target pixel and a result of checking the surrounding pixels, and determining based on the comparison result whether the second image data is to be added to the first image data; and generating the second image data to be added to the first image data based on the determination result, wherein the second image data is image data of any one of a transparent toner and a white toner.

\* \* \* \* \*